(12) United States Patent
Okamura et al.

(10) Patent No.: US 8,962,505 B2
(45) Date of Patent: *Feb. 24, 2015

(54) SINTERED CUBIC BORON NITRIDE COMPACT AND SINTERED CUBIC BORON NITRIDE COMPACT TOOL

(75) Inventors: Katsumi Okamura, Hyogo (JP); Machiko Abe, Hyogo (JP); Satoru Kukino, Hyogo (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/700,041

(22) PCT Filed: Oct. 26, 2011

(86) PCT No.: PCT/JP2011/074628
§ 371 (c)(1),
(2), (4) Date: Nov. 26, 2012

(87) PCT Pub. No.: WO2012/057184
PCT Pub. Date: May 3, 2012

(65) Prior Publication Data
US 2013/0079215 A1   Mar. 28, 2013

(30) Foreign Application Priority Data

Oct. 27, 2010 (JP) ................................. 2010-240646

(51) Int. Cl.
| | | |
|---|---|---|
| *C04B 35/5831* | (2006.01) | |
| *C04B 35/119* | (2006.01) | |
| *C04B 35/10* | (2006.01) | |
| *C04B 35/117* | (2006.01) | |
| *C04B 35/63* | (2006.01) | |

(52) U.S. Cl.
CPC ............... *C04B 35/10* (2013.01); *C04B 35/117* (2013.01); *C04B 35/5831* (2013.01); *C04B 35/119* (2013.01); *C04B 35/6306* (2013.01); *B23C 2222/14* (2013.01); *B23C 2226/125* (2013.01); *C04B 2235/3217* (2013.01); *C04B 2235/3244* (2013.01); *C04B 2235/3813* (2013.01); *C04B 2235/3839* (2013.01); *C04B 2235/3852* (2013.01); *C04B 2235/386* (2013.01); *C04B 2235/5436* (2013.01); *C04B 2235/5445* (2013.01); *C04B 2235/765* (2013.01); *C04B 2235/80* (2013.01); *C04B 2235/3856* (2013.01); *C04B 2235/3886* (2013.01)
USPC .......................... 501/96.4; 501/105; 407/119

(58) Field of Classification Search
CPC ............ B23C 2226/125; C04B 35/117; C04B 35/119; C04B 2235/3217; C04B 2235/386; C04B 2235/5436; C04B 2235/5445
USPC ..................... 501/96.4, 105; 407/119
See application file for complete search history.

(56) References Cited

U.S. PATENT DOCUMENTS

| | | |
|---|---|---|
| 5,690,706 A | 11/1997 | Sigalas et al. |
| 6,316,094 B1 | 11/2001 | Fukaya et al. |
| 2004/0002418 A1 | 1/2004 | Scurlock et al. |
| 2007/0099030 A1 | 5/2007 | Dahl |
| 2008/0016785 A1 | 1/2008 | Kukino et al. |
| 2008/0264203 A1 | 10/2008 | Dahl et al. |
| 2010/0313489 A1* | 12/2010 | Teramoto et al. ............... 51/309 |
| 2012/0208006 A1* | 8/2012 | Okamura et al. ............. 428/328 |

(Continued)

FOREIGN PATENT DOCUMENTS

| | | | |
|---|---|---|---|
| CN | 1190424 A | | 8/1998 |
| CN | 1242350 | * | 1/2000 |

(Continued)

OTHER PUBLICATIONS

International Search Report for PCT/JP2011/074628 issued Dec. 27, 2011.
Chinese Office Action for corresponding Chinese Application No. 201180004615.6 of related U.S. Appl. No. 13/503,327, dated Nov. 4, 2013, 12 pages.
International Search Report for corresponding International Application No. PCT/JP2011/066814 of related U.S. Appl. No. 13/503,327, dated Sep. 20, 2011, 2 pages.
Angseryd, J. et al., "Detailed microstructure of a cBN based cutting tool material," Int. Journal of Refractory Metals & Hard Materials, Mar. 2009, pp. 249-255, vol. 27, Issue 2.
Korean Office Action for corresponding Korean Application No. 10-2012-7011397 of related U.S. Appl. No. 13/503,327, dated Dec. 30, 2013, 7 pages.
Office Action for related U.S. Appl. No. 13/503,327, dated Jul. 3, 2013, 7 pages.
Extended European Search Report for corresponding European Application No. 11836317.5, dated May 16, 2014, 5 pages.
Notification of the First Office Action for corresponding Chinese Application No. 2011800171279, dated Sep. 28, 2014, 11 pages.

*Primary Examiner* — Karl Group
(74) *Attorney, Agent, or Firm* — Ditthavong & Steiner, P.C.

(57) ABSTRACT

It is an object of the present invention to provide a sintered cBN compact having excellent wear resistance and fracture resistance even in machining centrifugally cast iron having a property of being difficult to machine, and to provide a sintered cBN compact tool. A sintered cBN compact of the present invention contains 20% by volume or more and 65% by volume or less of cBN and, as a binder, 34% by volume or more and less than 80% by volume of $Al_2O_3$, at least one selected from the group consisting of nitrides, carbides, carbonitrides, borides, and boronitrides of Zr and solid solutions thereof (hereinafter, referred to as "X"), and $ZrO_2$, the total amount of X and $ZrO_2$ being 1.0% by volume or more and 6.0% by volume or less, the volume ratio of $ZrO_2$ to $Al_2O_3$, $ZrO_2/Al_2O_3$, being 0.010 or more and less than 0.100, in which the ratio $I_{tetragonal\ ZrO2}(101)/I_{\alpha Al2O3}(110)$ is 0.1 or more and 3 or less, where $I_{tetragonal\ ZrO2}(101)$ is the intensity of the (101) plane of tetragonal $ZrO_2$ and $I_{\alpha Al2O3}(110)$ is the intensity of the (110) plane of $\alpha Al_2O_3$ among X-ray diffraction peaks of the sintered cBN compact.

4 Claims, No Drawings

(56) References Cited

U.S. PATENT DOCUMENTS

2012/0304544 A1* 12/2012 Yokoshi .................. 51/295
2012/0329632 A1* 12/2012 Malik et al. .................. 501/87

FOREIGN PATENT DOCUMENTS

| | | | |
|---|---|---|---|
| CN | 1485299 A | 3/2004 |
| CN | 1526683 A | 9/2004 |
| CN | 1978383 A | 6/2007 |
| CN | 101084170 A | 12/2007 |
| CN | 101102863 A | 1/2008 |
| CN | 101293773 A | 10/2008 |
| CN | 101583451 A | 11/2009 |
| EP | 2612719 A1 | 7/2013 |
| JP | 58-58247 A | 1/1983 |
| JP | 2-92868 A | 4/1990 |
| JP | 2282443 A | 11/1990 |
| JP | 03205364 A | 9/1991 |
| JP | 04026554 * | 1/1992 |
| JP | 2546709 * | 10/1996 |
| JP | 2971203 B2 | 8/1999 |
| JP | 2000044347 A | 2/2000 |
| JP | 2000044350 A | 2/2000 |
| JP | 2002-003276 A | 9/2002 |
| JP | 2002302732 A | 10/2002 |
| JP | 2006315898 A | 11/2006 |
| JP | 2008094670 A | 4/2008 |
| JP | 2010089223 A | 4/2010 |
| KR | 100412181 B1 | 3/2004 |
| KR | 20090116720 A | 11/2009 |
| WO | 9636677 A1 | 11/1996 |
| WO | 2006046128 A1 | 5/2006 |
| WO | WO 2008/087940 A1 | 7/2008 |
| WO | 2011059020 * | 5/2011 |
| WO | WO 2011/059020 A1 | 5/2011 |

* cited by examiner

SINTERED CUBIC BORON NITRIDE COMPACT AND SINTERED CUBIC BORON NITRIDE COMPACT TOOL

TECHNICAL FIELD

The present invention relates to a sintered cubic boron nitride compact (sintered cBN compact) having excellent wear resistance and fracture resistance, and to a sintered compact tool using the same. More particularly, the invention relates to a sintered cubic boron nitride compact having excellent wear resistance and fracture resistance and serving as a cutting tool for centrifugally cast iron.

BACKGROUND ART

In recent years, there has been a tendency for the material used to form cylinder blocks to shift from cast iron to aluminum in order to reduce the weight of engines, and cast iron produced by a centrifugal casting process has been increasingly employed as cylinder liners in the blocks.

Centrifugally cast iron has low machinability compared to common cast iron produced using sand molds, and the life of tools used for cutting centrifugally cast iron is noticeably short, which is a problem.

Since centrifugally cast iron has fine, dense A-type structures, which are also observed in conventional sand mold cast iron, wear of a cutting tool is significantly increased by thermal reaction with a workpiece, resulting in a marked decrease in machinability of centrifugally cast iron.

It is known that a sintered cBN compact to which $Al_2O_3$ having excellent oxidation resistance and chemical stability has been added is effective as a cutting tool in order to machine such centrifugally cast iron having a property of being difficult to machine. However, the toughness and sinterability of a sintered cBN compact to which $Al_2O_3$ has been added are low. In order to overcome this problem, Patent Literatures 1 and 2 each disclose a sintered cBN compact whose fracture resistance is improved by addition of $ZrO_2$ to $Al_2O_3$.

For example, Patent Literature 1 discloses a sintered cBN compact including $Al_2O_3$, TiC or TiCN, and $ZrO_2$, in which the sintered cBN compact is produced using a starting material containing 50% by volume or more and 80% by volume or less of the cBN component, 1% by volume or more and 20% by volume or less of TiC or 0.5% by volume or more and 15% by volume or less of TiCN, and 15% by volume or more and 50% by volume or less of $Al_2O_3$ and $ZrO_2$, the $ZrO_2/Al_2O_3$ ratio by weight being 0.1 or more and 4 or less. When the ratio by weight specified by $ZrO_2/Al_2O_3$ is converted to a ratio by volume, $0.065 \leq ZrO_2/Al_2O_3 \leq 2.62$.

Furthermore, Patent Literature 2 discloses a material for a sintered compact having a composition including 40% to 70% by volume of cBN powder particles, 15% to 45% by volume of titanium nitride serving as a major component of a binder phase and 15% to 35% by volume of mixed powder particles of $Al_2O_3$, $ZrO_2$, AlN, and acicular crystals of SiC serving as an accessory component of the binder phase, in which the accessory component of the binder phase is composed of 50% to 65% by volume of $Al_2O_3$, 1% to 5% by volume of $ZrO_2$, 20% to 40% by volume of AlN, and 5% to 15% by volume of acicular crystals of SiC.

In a centrifugal casting process, by pouring molten cast iron into a rotating cylindrical mold, it is possible to produce a thin sleeve, which is advantageous. However, since a portion of the sleeve in contact with the mold and a portion of the sleeve located at the inner diameter surface are rapidly cooled, the cast iron structure is refined, resulting in generation of abnormal structures, such as dendritic structures and rosette structures. These abnormal structures, such as dendritic structures and rosette structures, have very poor machinability. In most recent sleeves made of centrifugally cast iron, the thickness has been decreased in order to shorten the distance between cylinder bores, and it has become necessary to cut, in addition to fine, dense A-type structures which are regions to be cut in conventional centrifugally cast iron, regions where rosette structures and dendritic structures exist, which are not regions to be cut in conventional centrifugally cast iron. When regions where rosette structures and dendritic structures exist are subjected to cutting, machining is required to be carried out under thermally harsh conditions compared with conventional centrifugally cast iron, and therefore, machinability is markedly decreased, which is a problem.

When such centrifugally cast iron is machined using the sintered compact described in any of the above-mentioned Patent Literatures, since a large amount of $ZrO_2$ having very low thermal conductivity compared to $Al_2O_3$ is contained, the thermal conductivity of the sintered compact decreases, and reaction with the workpiece under machining proceeds markedly, resulting in a significant decrease in wear resistance.

CITATION LIST

Patent Literature

PTL 1: International Publication No. 2008/087940
PTL 2: Japanese Patent No. 2971203

SUMMARY OF INVENTION

Technical Problem

It is an object of the present invention to provide a sintered cBN compact having excellent wear resistance and fracture resistance even in machining centrifugally cast iron having a property of being difficult to machine and having, in addition to, the fine, dense A-type structures, rosette structures and dendritic structures, and to provide a sintered cBN compact tool.

Solution to Problem

The present inventors have performed thorough studies and have found that, in a sintered cBN compact, by adding, as a binder, $Al_2O_3$, $ZrO_2$, and at least one selected from the group consisting of nitrides, carbides, carbonitrides, borides, and boronitrides of Zr and solid solutions thereof, the X-ray diffraction intensity of $ZrO_2$ changes. Furthermore, it has been found that the ratio $I_{tetragonal\ ZrO2}(101)/I_{\alpha Al2O3}(110)$ correlates with cutting performance and sinterability. Furthermore, it has been found that, by setting the volume ratio of $ZrO_2$ to $Al_2O_3$ in the sintered cBN compact and the numerical value of the ratio $I_{tetragonal\ ZrO2}(101)/I_{\alpha Al2O3}(110)$ within specified ranges, both wear resistance and fracture resistance can be markedly improved. Thus, the present invention has been achieved.

That is, the present invention is as described below.
(1) A sintered cBN compact containing 20% by volume or more and 65% by volume or less of cBN relative to the whole sintered compact and, as a binder, 34% by volume or more and less than 80% by volume of $Al_2O_3$ relative to the whole sintered compact, at least one selected from the group consisting of nitrides, carbides, carbonitrides, borides, and boronitrides of Zr and solid solutions thereof (hereinafter, referred to as "X"), and $ZrO_2$, the total amount of X and $ZrO_2$ being 1.0% by volume or more and 6.0% by volume or less relative to the whole sintered compact, the volume ratio of $ZrO_2$ to $Al_2O_3$, $ZrO_2/Al_2O_3$, being 0.010 or more and less than 0.100, characterized in that the ratio $I_{tetragonal\ ZrO2}(101)/I_{\alpha Al2O3}(110)$ is 0.1 or more and 3 or less, where $I_{tetragonal\ ZrO2}(101)$ is the intensity of the (101) plane of tetragonal $ZrO_2$ and $I_{\alpha Al2O3}(110)$ is the intensity of the (110) plane of $\alpha Al_2O_3$ among X-ray diffraction peaks of the sintered cBN compact.

(2) The sintered cBN compact according to (1) described above, characterized by containing ZrC as the X.

(3) The sintered cBN compact according to (1) or (2) described above, characterized in that the ratio $I_{tetragonal\ ZrO2}(101)/I_{\alpha Al2O3}(110)$ is 0.2 or more and 0.5 or less.

(4) A sintered cBN compact tool characterized by including the sintered cBN compact according to any one of (1) to (3) described above at least at an edge portion thereof.

Advantageous Effects of Invention

According to the present invention, it is possible to obtain a sintered cBN compact having excellent wear resistance and fracture resistance, which is useful as a cutting tool used for machining a difficult-to-machine workpiece, such as centrifugally cast iron having, in addition to, fine, dense A-type structures, rosette structures and dendritic structures.

DESCRIPTION OF EMBODIMENTS

A sintered cBN compact of the present invention contains 20% by volume or more and 65% by volume or less of cBN relative to the whole sintered compact and, as a binder, 34% by volume or more and less than 80% by volume of $Al_2O_3$ relative to the whole sintered compact, at least one selected from the group consisting of nitrides, carbides, carbonitrides, borides, and boronitrides of Zr and solid solutions thereof (hereinafter, referred to as "X"), and $ZrO_2$, the total amount of X and $ZrO_2$ being 1.0% by volume or more and 6.0% by volume or less, the volume ratio of $ZrO_2$ to $Al_2O_3$, $ZrO_2/Al_2O_3$, being 0.010 or more and less than 0.100. The sintered cBN compact is characterized in that the ratio $I_{tetragonal\ ZrO2}(101)/I_{\alpha Al2O3}(110)$ is 0.1 or more and 3 or less, where $I_{tetragonal\ ZrO2}(101)$ is the intensity of the (101) plane of tetragonal $ZrO_2$ and $I_{\alpha Al2O3}(110)$ is the intensity of the (110) plane of $\alpha Al_2O_3$ among X-ray diffraction peaks of the sintered cBN compact.

In this case, the cBN content in the sintered compact is 20% by volume or more and 65% by volume or less, and preferably 40% by volume or more and 50% by volume or less, relative to the whole sintered compact. When the cBN component content is less than 20% by volume, strength is insufficient for cutting difficult-to-machine centrifugally cast iron, and fracture resistance is decreased, resulting in fracturing of edge. On the other hand, when the content exceeds 65% by volume, since the $Al_2O_3$ content relatively decreases, heat resistance is decreased. As a result, a reaction is likely to be caused by heat generated during cutting, and wear is likely to increase.

Furthermore, in the present invention, the composition of the individual components relative to the whole sintered compact, which can be measured, for example, as described below, is the same as that of the starting materials used and does not change.

Regarding the composition of the individual components, first, a sintered cBN compact was subjected to mirror polishing, and the structure in a given region was photographed as a backscattered electron image of a scanning electron microscope with a magnification of 10,000 times. Three gradations of light and shade contrast corresponding to the composition were observed in the photograph taken. An analysis with an energy dispersive X-ray analyzer (EDX) in the same field of view at the same time revealed that darkest portions in the observed field corresponded to cBN particles, middle-toned portions corresponded to $Al_2O_3$ particles, and lightest portions corresponded to Zr compounds (oxides, carbides, nitrides, borides, and boronitrides). By subjecting the backscattered electron image to image analysis, the contents by volume of the individual components were determined.

Furthermore, the composition of the Zr compounds was measured by chemical analysis, such as plasma emission spectroscopic analysis (ICP) or gas analysis.

A description will now be made on a binder.

A sintered cBN compact of the present invention contains $Al_2O_3$ in the amount of 34% by volume or more and less than 80% by volume, preferably 50% by volume or more and 60% by volume or less, relative to the whole sintered compact. When the $Al_2O_3$ content is less than 34% by volume, wear resistance is decreased. When the $Al_2O_3$ content is 80% by volume or more, fracture resistance is decreased.

By incorporating $Al_2O_3$, it is possible to prevent an increase of wear due to a reaction between cast iron and the edge components by using properties, such as oxidation resistance and chemical stability, of $Al_2O_3$. However, in a system containing a large amount of $Al_2O_3$, pores are likely to be generated in the surface of cBN, resulting in decreases in sinterability and fracture resistance.

Furthermore, $Al_2O_3$ has high heat resistance, but lacks in toughness. Therefore, incorporation of $Al_2O_3$ only causes easy occurrence of chipping in the edge. By incorporating at least one selected from the group consisting of nitrides, carbides, carbonitrides, borides, and boronitrides of Zr and solid solutions thereof (hereinafter, referred to as "X") which easily reacts with cBN and markedly improves thermal conductivity in the binder, and $ZrO_2$ which is effective in improving toughness of $Al_2O_3$, it is possible to markedly improve both fracture resistance and wear resistance.

At least one selected from the group consisting of nitrides, carbides, carbonitrides, borides, and boronitrides of Zr and solid solutions thereof (hereinafter, referred to as "X") and $ZrO_2$ are contained in the sintered cBN compact, in total, in the amount of 1.0% by volume or more and 6.0% by volume or less relative to the whole sintered compact, and the volume ratio of $ZrO_2$ to $Al_2O_3$, $ZrO_2/Al_2O_3$, is 0.010 or more and less than 0.100.

By incorporating X and $ZrO_2$, in total, in the amount of 1.0% by volume or more and 6.0% by volume or less, fracture resistance is improved. The total amount of X and $ZrO_2$ is more preferably more than 2.5% by volume and 4.0% by volume or less, by which wear resistance is further improved.

Furthermore, by setting the volume ratio of $ZrO_2$ to $Al_2O_3$, $ZrO_2/Al_2O_3$ to be 0.010 or more and less than 0.100, wear resistance and fracture resistance can be improved. When the ratio $ZrO_2/Al_2O_3$ is less than 0.010, it is not possible to obtain the effect of improving toughness of $Al_2O_3$ by $ZrO_2$, resulting in a decrease in fracture resistance. When the ratio is 0.100 or more, wear resistance is decreased. The volume ratio of $ZrO_2$ to $Al_2O_3$, $ZrO_2/Al_2O_3$ is more preferably 0.02 or more and less than 0.06.

Furthermore, when the ratio $I_{tetragonal\ ZrO2}(101)/I_{\alpha Al2O3}(110)$ is 0.1 or more and 3 or less, where $I_{tetragonal\ ZrO2}(101)$ is the intensity of the (101) plane of tetragonal $ZrO_2$ and $I_{\alpha Al2O3}(110)$ is the intensity of the (110) plane of $\alpha Al_2O_3$ among X-ray diffraction peaks of the sintered cBN compact measured by an X-ray diffractometer (Cu used for X-ray tube), sinterability is increased, and a dense sintered compact can be obtained. Therefore, the sintered compact has excellent fracture resistance and wear resistance, and also the yield of the sintered compact is markedly improved, thus contributing to a reduction in costs. When the ratio $I_{tetragonal\ ZrO2}(101)/I_{\alpha Al2O3}(110)$ is less than 0.1, the effect of improving sinterability cannot be obtained. When the ratio $I_{tetragonal\ ZrO2}(101)/I_{\alpha Al2O3}(110)$ exceeds 3, wear resistance is decreased. The ratio $I_{tetragonal\ ZrO2}(101)/I_{\alpha Al2O3}(110)$ is more preferably 0.2 or more and 0.5 or less.

In particular, by incorporating ZrC as X, the peak intensity of tetragonal $ZrO_2(101)$ can be selectively increased. Even when the $Al_2O_3$ content is relatively increased by a small amount of ZrC, the ratio $I_{tetragonal\ ZrO2}(101)/I_{\alpha Al2O3}(110)$ can be 0.2 or more and 0.5 or less, resulting in improvement in sinterability, fracture resistance, and productivity. Preferably, the content of ZrC in the sintered cBN compact is 0.1% by volume or more and 3.0% by volume or less.

A sintered compact of the present invention can be obtained by sintering the starting materials for the sintered compact.

For example, first, $Al_2O_3$, $ZrO_2$, and X are pulverized and mixed in advance to produce a binder. Then, mixed powder obtained by homogeneously mixing cBN particles and the binder is sintered under ultrahigh pressure conditions (5.5 to 7 GPa, 1,300° C. to 1,800° C.). Thereby, a sintered cBN compact of the present invention can be produced.

The volume-average particle size of $Al_2O_3$ used as the binder is preferably 1 μm or less, and more preferably 50 to 500 nm. Furthermore, the volume-average particle size of each of X and $ZrO_2$ used as the binder is preferably 1 μm or less, and more preferably 10 to 100 nm.

As a sintered cBN compact tool of the present invention, a sintered cBN compact tool including a sintered cBN compact at least at an edge portion of a substrate made of cemented carbide, or a sintered cBN compact tool composed of a sintered cBN compact only may be mentioned. These can be produced in accordance with a known method. Furthermore, the sintered cBN compact may have a hard ceramic coating layer on the surface thereof.

EXAMPLES

An example of an embodiment of the present invention will be described below on the basis of Examples. It is to be understood that Examples below are merely illustrative and do not limit the present invention.

Example 1

$Al_2O_3$ with a volume-average particle size of 1 μm or less, $ZrO_2$ with a volume-average particle size of 0.5 μm or less, and a Zr compound with a volume-average particle size of 1 μm or less were used, with the composition shown in Table. The compounds were mixed and pulverized in advance with $ZrO_2$ ball media having a diameter of 0.6 mm in an ethanol solvent at a flow rate of 0.6 L/min for 150 minutes. Then, by removing the media, a special binder in which Zr compound ultrafine particles were homogeneously dispersed in $Al_2O_3$ was produced. The volume-average particle size of $Al_2O_3$ was 250 nm, and the volume-average particle size of X and $ZrO_2$ was 50 nm after mixing and pulverization.

Mixed powder, which was obtained by homogeneously mixing cBN particles (volume-average particle size: 2 μm) having the composition shown in Table and the binder by a ball mill mixing method using $ZrO_2$ ball media having a diameter of 3 mm, was stacked on a support plate made of cemented carbide and placed in a capsule made of Mo. Then, by performing sintering with an ultrahigh-pressure apparatus at a pressure of 6.5 GPa and a temperature of 1,700° C. for 30 minutes, a sintered compact was produced. Compounds were identified by X-ray diffraction measurement, and the ratio $I_{tetragonal\ ZrO2}(101)/I_{\alpha Al2O3}(110)$ was calculated.

Examples 2 to 10 and Comparative Examples 1 to 5

Sintered cBN compacts were produced as in Example 1 except that the composition and compounds of starting materials for sintered compacts were changed to those shown in Table.

Evaluation

The resulting sintered compacts were processed into cutting inserts complying with ISO standard SNGN090312, and a continuous cutting test (inner diameter) was conducted.

A centrifugally cast iron sleeve with an inner diameter of 85 mm was turned at a cutting speed of 700 m/min, with a depth of cut of 0.3 mm, and with a feed of 0.05 mm/rev, using wet cutting [coolant: emulsion (manufactured by Japan Fluid System, trade name: System Cut 96) diluted 20 times]. The flank wear amount after cutting 1 km and the edge state after cutting 2 km (presence or absence of flank wear and chipping) were checked.

The results thereof are shown in Table.

In all of the sintered cBN compacts of Examples, a normal polished surface is obtained. In contrast, in Comparative Examples 1 and 2 in which X is not contained, very small falling-off of the sintered compact is observed, which is caused by insufficient sintering.

When Examples 1 to 4 are compared, in Example 3 in which the cBN content is in the range of 40% to 50% by volume, the wear amount is smallest and good results are obtained.

In Examples 1 to 10 in which the $X+ZrO_2$ value is in the range 1.0% to 6.0% by volume, the wear amount is markedly small compared with Comparative Example 3 in which the same value is 10.0% by volume, and good results are obtained. Furthermore, in Example 3 in which the same value is in the range of 2.5% to 4.0% by volume, the ratio $ZrO_2/Al_2O_3$ is in the range of 0.02 to 0.06, and the ratio $I_{tetragonal\ ZrO2}(101)/I_{\alpha Al2O3}(110)$ is in the range of 0.2 to 0.5, the wear amount is smallest, fracturing and chipping do not occur, and the best results are obtained.

In Comparative Example 4 in which the ratio $ZrO_2/Al_2O_3$ is 0.125 and the ratio $I_{tetragonal\ ZrO2}(101)/I_{Al2O3}(110)$ is 5.8, the wear amount is markedly large compared with Examples 1 to 10 because the wear resistance of $ZrO_2$ is markedly lower than that of $Al_2O_3$, and it is assumed that at the point of 2 km, the cutting force is increased by the large wear amount, resulting in fracturing.

In Comparative Example 5, in which the ratio $I_{tetragonal\ ZrO2}(101)/I_{\alpha Al2O3}(110)$ is 0.05, it is assumed that wear resistance and fracture resistance are decreased because of insufficient sintering.

TABLE

| | cBN (vol %) | Starting material | Al$_2$O$_3$ (vol %) | ZrO$_2$ (vol %) | X (vol %) | ZrO$_2$ + X (vol %) | ZrO$_2$/Al$_2$O$_3$ (volume ratio) | I$_{tetragonal ZrO2}$(101)/ I$_{\alpha Al2O3}$(110) | Wear amount after cutting 1 km (μm) | Edge state after cutting 2 km |
|---|---|---|---|---|---|---|---|---|---|---|
| Example 1 | 20 | cBN, Al$_2$O$_3$, ZrO$_2$, ZrC | 77.9 | 1.6 | 0.5 | 2.1 | 0.021 | 0.8 | 82 | Very small chipping |
| Example 2 | 32 | cBN, Al$_2$O$_3$, ZrO$_2$, ZrC | 65.5 | 1.0 | 1.5 | 2.5 | 0.015 | 0.4 | 72 | Normal wear |
| Example 3 | 45 | cBN, Al$_2$O$_3$, ZrO$_2$, ZrC | 52.3 | 1.2 | 1.5 | 2.7 | 0.023 | 0.4 | 61 | Normal wear |
| Example 4 | 65 | cBN, Al$_2$O$_3$, ZrO$_2$, ZrC | 34 | 0.5 | 0.5 | 1.0 | 0.015 | 0.5 | 92 | Large wear |
| Example 5 | 45 | cBN, Al$_2$O$_3$, ZrO$_2$, ZrN | 51 | 3.0 | 1.0 | 4.0 | 0.059 | 1.9 | 78 | Very small chipping |
| Example 6 | 45 | cBN, Al$_2$O$_3$, ZrO$_2$, ZrB$_2$ | 49 | 4.5 | 1.5 | 6.0 | 0.092 | 3.0 | 81 | Normal wear |
| Example 7 | 45 | cBN, Al$_2$O$_3$, ZrO$_2$, Zr$_5$B$_2$N$_2$ | 49.5 | 3.0 | 2.5 | 5.5 | 0.061 | 1.5 | 92 | Very small chipping |
| Example 8 | 45 | cBN, Al$_2$O$_3$, ZrO$_2$, ZrC | 51.7 | 1.8 | 1.5 | 3.3 | 0.035 | 0.6 | 70 | Normal wear |
| Example 9 | 45 | cBN, Al$_2$O$_3$, ZrO$_2$, ZrC | 52.9 | 0.6 | 1.5 | 2.1 | 0.011 | 0.2 | 67 | Chipping |
| Example 10 | 45 | cBN, Al$_2$O$_3$, ZrO$_2$, ZrCN | 50 | 2.0 | 3.0 | 5.0 | 0.040 | 2.5 | 75 | Very small chipping |
| Comparative Example 1 | 45 | cBN, Al$_2$O$_3$, ZrO$_2$ | 52 | 3.0 | 0 | 3.0 | 0.058 | 0.1 | 154 | Fracturing |
| Comparative Example 2 | 45 | cBN, Al$_2$O$_3$ | 55 | 0 | 0 | 0 | 0.000 | 0.0 | 182 | Fracturing |
| Comparative Example 3 | 45 | cBN, Al$_2$O$_3$, ZrO$_2$, ZrC | 45 | 2.0 | 8.0 | 10.0 | 0.044 | 1.2 | 137 | Fracturing |
| Comparative Example 4 | 50 | cBN, Al$_2$O$_3$, ZrO$_2$, ZrC | 44 | 5.5 | 0.5 | 6.0 | 0.125 | 5.8 | 139 | Fracturing |
| Comparative Example 5 | 40 | cBN, Al$_2$O$_3$, ZrO$_2$, ZrB$_2$ | 54.2 | 0.8 | 5.0 | 5.8 | 0.015 | 0.05 | 132 | Fracturing |

INDUSTRIAL APPLICABILITY

A sintered cBN compact of the present invention has excellent wear resistance and fracture resistance, and is useful as a cutting tool used for machining a difficult-to-machine workpiece, such as centrifugally cast iron having, in addition to, fine, dense A-type structures, rosette structures and dendritic structures.

The invention claimed is:

1. A sintered cBN compact, containing:
   20% by volume or more and 65% by volume or less of cBN relative to the whole sintered compact;
   as a binder, 34% by volume or more and less than 80% by volume of Al$_2$O$_3$ relative to the whole sintered compact, and ZrC; and
   ZrO$_2$,
   wherein the total amount of ZrC and ZrO$_2$ being 1.0% by volume or more and 6.0% by volume or less relative to the whole sintered compact, the volume ratio of ZrO$_2$ to Al$_2$O$_3$, ZrO$_2$/Al$_2$O$_3$, being 0.010 or more and less than 0.100;
   wherein the ratio I$_{tetragonal ZrO2}$(101)/I$_{\alpha Al2O3}$(110) is 0.1 or more and 3 or less, where I$_{tetragonal ZrO2}$(101) is the intensity of the (101) plane of tetragonal ZrO$_2$ and I$_{\alpha Al2O3}$(110) is the intensity of the (110) plane of $\alpha$Al$_2$O$_3$ among X-ray diffraction peaks of the sintered cBN compact; and
   wherein the content of the ZrC in the sintered cBN compact is 0.1% by volume or more and 3.0% by volume or less.

2. The sintered cBN compact according to claim 1, wherein the ratio t$_{tetragonal ZrO2}$(101)/I$_{\alpha Al2O3}$(110) is 0.2 or more and 0.5 or less.

3. A sintered cBN compact tool comprising the sintered cBN compact according to claim 1 at least at an edge portion thereof.

4. A sintered cBN compact tool comprising the sintered cBN compact according to claim 2 at least at an edge portion thereof.

* * * * *